J. HODGE.
Fifth-Wheel.
No. 164,738.
2 Sheets--Sheet 1.
Patented June 22, 1875.
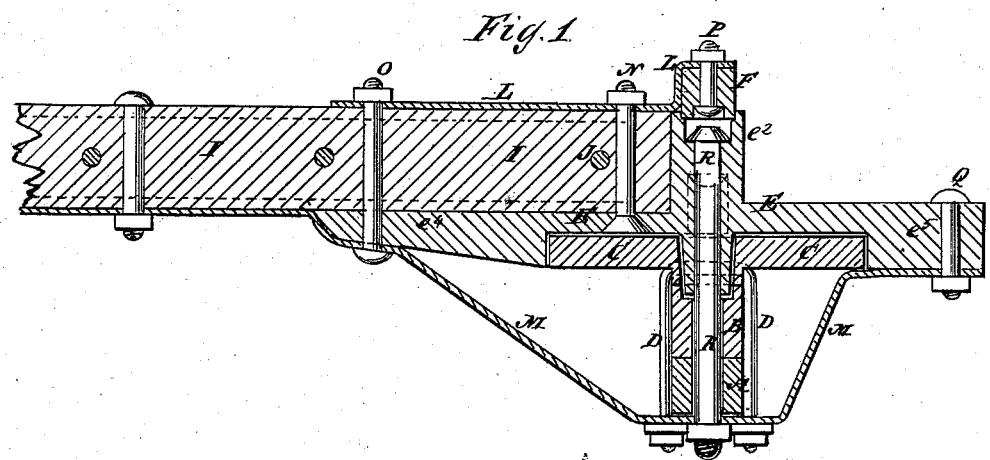
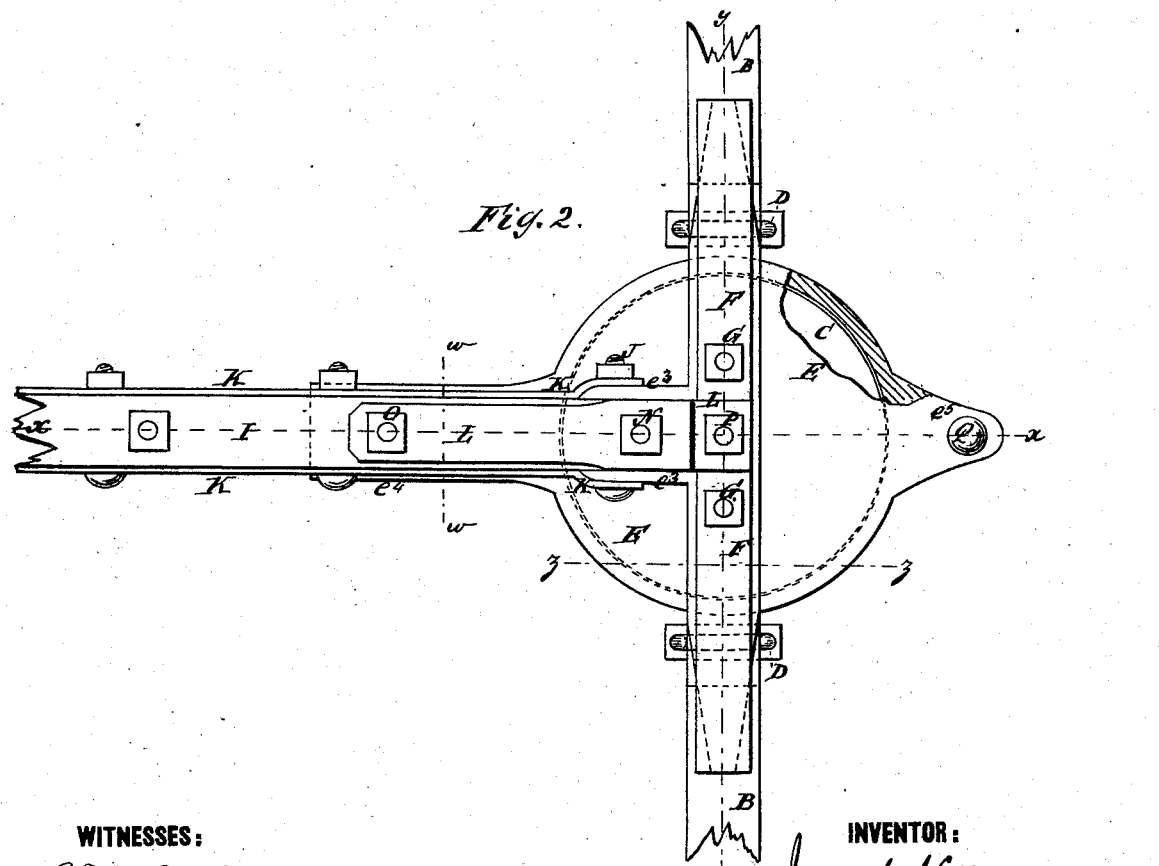
WITNESSES:
E. Wolff
N. F. Terry
INVENTOR:
Jacob Hodge
BY
ATTORNEYS.

2 Sheets--Sheet 2.
J. HODGE.
Fifth-Wheel.
No. 164,738. Patented June 22, 1875.
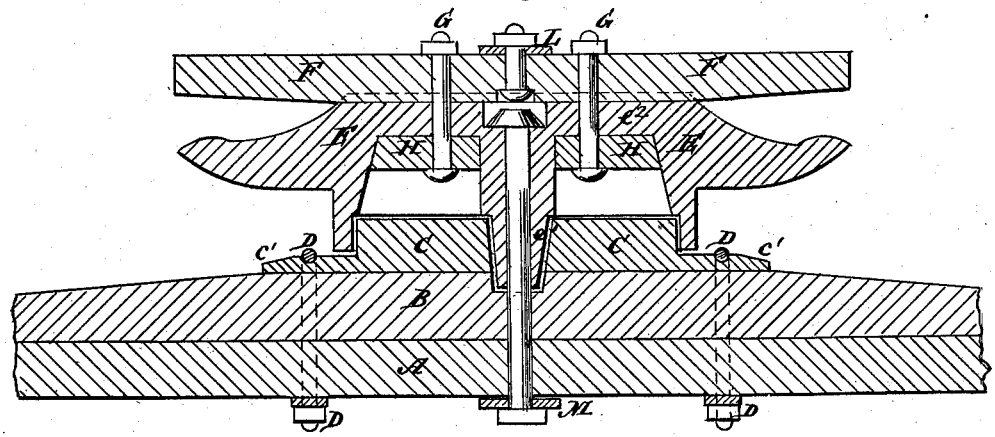
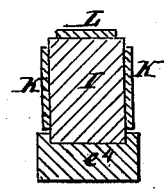
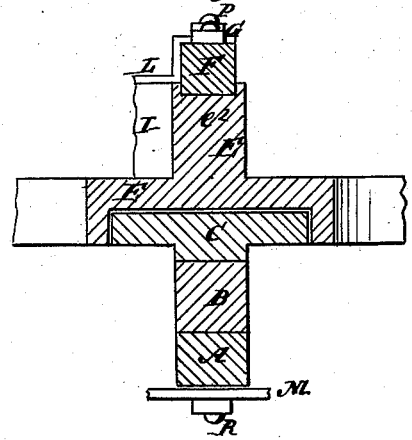
WITNESSES:
E. Wolff
A. F. Terry
INVENTOR:
Jacob Hodge
BY
ATTORNEYS.
THE GRAPHIC CO.PHOTO-LITH.39 & 41 PARK PLACE, N.Y.

UNITED STATES PATENT OFFICE.

JACOB HODGE, OF SPRINGFIELD, ILLINOIS.

IMPROVEMENT IN FIFTH-WHEELS.

Specification forming part of Letters Patent No. 164,738, dated June 22, 1875; application filed April 24, 1875.

*To all whom it may concern:*

Be it known that I, JACOB HODGE, of Springfield, in the county of Sangamon and State of Illinois, have invented a new and useful Improvement in Combined Fifth-Wheel and Head-Block, of which the following is a specification:

Figure 1, Sheet 1, is a detail vertical section of my improved device, taken through the line $x\ x$, Fig. 2. Fig. 2, Sheet 1, is a top view of the same, part being broken away to show the construction. Fig. 3, Sheet 2, is a detail vertical section of the same, taken through the line $y\ y$, Fig. 2. Fig. 4, Sheet 2, is a detail section, taken through the line $w\ w$, Fig. 2. Fig. 5, Sheet 2, is a detail section, taken through the line $z\ z$, Fig. 2.

Similar letters of reference indicate corresponding parts.

The object of this invention is to furnish a combined fifth-wheel and head-block, which shall be simple in construction, strong, durable, and not liable to get out of order.

The invention consists in the fifth-wheel made with a slightly convexed face, a central hole, and side lugs, and the head-block made with a recess having a slightly convexed face to receive the said fifth-wheel, the hub, the grooved transverse rib, the flanges, the rear flanged projection, and the forward projection, in combination with each other, and with the axle, the spring, the reach, and the king-bolt; in the combination of the straps and the bolts with the fifth-wheel, the head-block, the spring, the reach, and the axle; and in the combination of the wooden blocks with the recessed head-block, and with the bolts that secure said head-block to the spring, as hereinafter fully described.

A represents the iron part, and B represents the wooden part, of the axle. C is the fifth-wheel, which is a circular iron disk, the face of which is slightly convexed, and which has lugs $c'$ formed upon its sides to receive the clips D, by which it is firmly secured to the axle A B. In the center of the disk C is formed a slightly-tapering hole to receive the hub $e^1$, formed upon the center of the lower side of the circular disk of the head-block E. The lower side of the head-block E has a circular recess formed in it to receive and fit upon the fifth-wheel, and the face of which is slightly convexed, so as to bring the bearing toward the center or hub $e^1$ of said head-block. Upon the upper side of the head-block E is formed a transverse rib, $e^2$, upon which rests the spring F, and which is slightly grooved longitudinally to receive the said spring. The spring F is secured to the head-block E by two bolts, G, which pass up through the head-block E and the spring F, as shown in Fig. 3. The bolts G also pass through wooden blocks H, placed in recesses in the under side of the head-block E, to cushion the heads of the bolts G and give them less rigidity, and render them less liable to break than if they bear against the metal head-block directly.

Upon the rear side of the head-block E are formed two flanges, $e^3$, and an arm or projection, $e^4$, having slight flanges formed upon its side edges to form a seat for the reach I, the forward end of which abuts against the rib $e^2$ of said head-block. The reach I is secured in place by a horizontal bolt, J, which passes through the reach I, the flanges $e^3$, and through two metal straps, K, bolted to the sides of said reach.

The connection between the reach, head-block, fifth-wheel, and axle is strengthened by two metal straps, L M. The strap L is placed upon the upper side of the reach I, and secured to it by the bolts N O. The forward end of the strap L is bent upward and then forward, and is secured by the bolt P, that passes through the center of the spring F. The bolt N passes through the strap L, the reach I, and the body or plate of the head-block E, into the face of which the head of the said bolt is countersunk. The bolt O passes through the strap L, the reach I, the projection or arm $e^4$ of the head-block E, and through the strap M, which strap M extends back along the under side of the reach I, and is bolted to it. From the bolt O the strap M projects downward and forward, crosses the lower side of the center of the axle A B, projects upward and forward, and its forward end is secured to the projection $e^5$, formed upon the forward side of the head-block E, by a bolt, Q. R is the king-bolt, which passes down through the head-block E, the hub $e^1$, the fifth-wheel D, the axle B A, and the strap M, and has its head sunk into the rib $e^2$ of the said head-block E.

In this way the head of the king-bolt is bedded in the solid metal of the head-block, and cannot wear through the rear side of said head-block.

By this construction the coupling is braced and strengthened against the strain in stopping and starting the vehicle, and a much neater, simpler, stronger, and more durable coupling is produced than when made in the ordinary way.

Having thus described my invention, I claim as new and desire to secure by Letters Patent—

1. The fifth-wheel C, having a slightly convex face, a central hole, and the side lugs $c'$, and the head-block E, made with a recess, having a slightly convexed face to receive the said fifth-wheel C, the hub $e^1$, the grooved transverse rib $e^2$, the flanges $e^3$, the rear flanged projection $e^4$, and the forward projection $e^5$ in combination with each other, and with the axle A B, the spring F, the reach I, and the king-bolt R, substantially as herein shown and described.

2. The combination of the straps K L M, and the bolts N O Q, with the fifth-wheel C, the head-block E, the spring F, the reach I, and the axle A B, substantially as herein shown and described.

3. The combination of the wooden blocks H with the recessed head-block E, and with the bolts G that secure the said head-block to the spring F, substantially as herein shown and described.

JACOB HODGE.

Witnesses:
RICHARD HODGE,
BENJ. B. SAMPSON.